(12) United States Patent
Forster

(10) Patent No.: US 11,482,089 B2
(45) Date of Patent: Oct. 25, 2022

(54) INTERFACING ELECTRONIC ANTI-TAMPER DEVICES WITH DISPLAY ELEMENTS

(71) Applicant: Avery Dennison Retail Information Services, LLC, Mentor, OH (US)

(72) Inventor: Ian J. Forster, Chelmsford (GB)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 16/227,158

(22) Filed: Dec. 20, 2018

(65) Prior Publication Data

US 2019/0206212 A1  Jul. 4, 2019

Related U.S. Application Data

(60) Provisional application No. 62/611,332, filed on Dec. 28, 2017.

(51) Int. Cl.
| | |
|---|---|
| *G08B 13/24* | (2006.01) |
| *G06K 19/077* | (2006.01) |
| *G06K 19/073* | (2006.01) |
| *G06K 19/07* | (2006.01) |
| *G02F 1/137* | (2006.01) |

(52) U.S. Cl.
CPC ..... *G08B 13/2402* (2013.01); *G02F 1/13718* (2013.01); *G06K 19/0723* (2013.01); *G06K 19/07372* (2013.01); *G06K 19/07707* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0082564 A1* | 4/2006 | Poliankine | ........ | G02F 1/13452 345/204 |
| 2007/0285229 A1* | 12/2007 | Batra | ........ | G06K 19/07703 340/572.1 |
| 2008/0303637 A1* | 12/2008 | Gelbman | ........ | G06K 7/10079 340/10.42 |
| 2016/0086465 A1* | 3/2016 | Li | ........ | G06K 19/07786 340/572.7 |
| 2016/0342883 A1* | 11/2016 | Huhtasalo | ........ | G06K 19/07767 |
| 2017/0293968 A1* | 10/2017 | Russell | ........ | G06Q 10/00 |

FOREIGN PATENT DOCUMENTS

EP   2264647   12/2010

OTHER PUBLICATIONS

International Search Report and Written Opinion of ISA/EP prepared Mar. 21, 2019 for PCT/US2018/066727.
International Preliminary Report on Patentability dated Jun. 30, 2020 issued in corresponding IA No. PCT/US2018/066727 filed Dec. 20, 2018.

* cited by examiner

*Primary Examiner* — Thomas S McCormack

(57) ABSTRACT

An anti-tamper device combining a RFID component and an article surveillance or security component with a visual indicator. The article surveillance or security component is operatively coupled to a display so that an interruption of the RFID component is visibly indicated by the display. The visual indicator moves between a first state indicating a lack of tampering, and a second state indicating tampering without the need for a battery or external power source.

11 Claims, 2 Drawing Sheets

INTERFACING ELECTRONIC ANTI-TAMPER DEVICES WITH DISPLAY ELEMENTS

CROSS-REFERENCE TO RELATED APPLICATION(S)

The present application claims priority to and the benefit of U.S. provisional utility patent application No. 62/611,332 filed Dec. 28, 2017, which is incorporated herein by reference in its entirety.

BACKGROUND

The device of the present invention relates generally to an anti-tamper device for use in article surveillance type of applications. Specifically, the device interfaces a radio-frequency identification ("RFID") tag having an anti-tamper capacity with a visual indicator. While the present specification makes specific reference to use of the device in article surveillance type of applications, it must be appreciated that aspects of the present inventive subject matter are also equally amenable to other like applications.

RFID (Radio Frequency Identification) uses magnetic, electric or electromagnetic fields transmitted by a reader system") to stimulate a responsive device (known as an RFID "tag" or transponder) to identify itself and in some cases, provide additionally stored data. RFID tags typically include a semiconductor device commonly called the "chip" on which are formed a memory and operating circuitry, which is connected to an antenna. Typically, RFID tags act as transponders, providing information stored in the chip memory in response to a radio frequency ("RF") interrogation signal received from a reader, also referred to as an interrogator. In the case of passive RFID devices, the energy of the interrogation signal also provides the necessary energy to operate the RFID device.

RFID tags may be incorporated into or attached to articles to be tracked. In some instances, the tag may be attached to the outside of an article with adhesive, tape, or other means. In other instances, the RFID tag may be inserted within the article, such as being included in the packaging, located within the container of the article, or sewn into a garment. The RFID tags are manufactured with a unique identification number which is typically a simple serial number of a few bytes with a check digit attached. This identification number is incorporated into the RFID tag during manufacture. The user cannot alter this serial/identification number and manufacturers guarantee that each serial number is used only once. Such read-only RFID tags typically are permanently attached to an article to be tracked and, once attached, the serial number of the tag is associated with its host article in a computer database.

Traditional article surveillance in a retail environment is concerned with the embedding or attaching of a security label or tag to a retail item to deter shoplifting. These devices are typically used to identify tagged articles as they pass through a gated area with a detecting apparatus in a store. The tag attached to the product responds to a specific frequency emitted by a transmitter antenna. The response from the security tag is then picked up by the receiver antenna, which processes the tag response signal and triggers an alarm when certain criteria are met. One type of tag use essentially a resonant or LC circuit having a resonance peak frequency of between about 2 MHz and 10 MHz, and may be deactivated with a deactivation pad used by a store employee thus allowing the tag and the associated merchandise to pass through the gated area without setting off an alarm. More specifically, the deactivation pad subjects the tag to a strong magnetic field at a resonance frequency to induce voltage exceeding the breakdown voltage and detune the circuit by partially destroying the capacitor. Another type of security tag is one based on the acousto magnetic response of a resonator in the region of 50-60 kHz, where deactivation is achieved by changing a bias magnet incorporated into the tag. Unfortunately, the deactivation process does not cause a visual change in the tag. As a result, false alarms are common as there is no visual indication of whether or not the tag has been deactivated.

The present invention discloses an anti-tamper device combining a RFID component and security component with a visual indicator. The security component is operatively coupled to the RFID component so that an interruption of the RFID component is visibly indicated by the security component. The visual indicator moves between a first state indicating a lack of tampering, and a second state indicating tampering without the need for a battery or separate power source.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, is an anti-tamper device comprising an RFID component and an article surveillance or security component operatively coupled to the RFID component. The article surveillance or security component is comprised of a display element and a visual indicator which provides an indication of the intactness of the RFID component. More specifically, the visual indicator informs a user whether the RFID component is intact or whether it is damaged.

In a preferred embodiment, the RFID component further comprises a microchip and a capacitor that create an intact circuit. The circuit is in electrical communication with the display element of the article surveillance or security component. The display element is a bi-stable display that does not require a separate power source to indicate a change in the status of the RFID component. When the circuit is intact, the display element indicates a first state. When the circuit is interrupted, the change in voltage allows the display element to indicate a second state. The second state is visually different from the first state, thereby allowing a user to easily visualize if the anti-tamper device experienced tampering.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
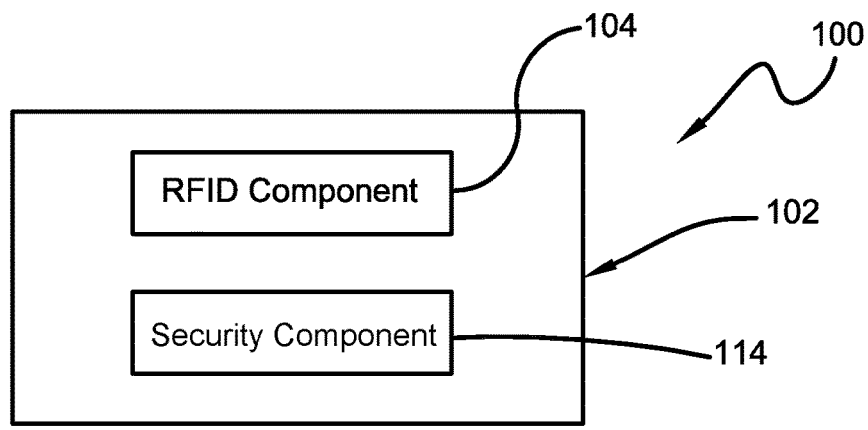
FIG. 1 illustrates a block diagram of an anti-tamper device with both radio-frequency identification (RFID) functionality and electronic article surveillance (EAS) functionality in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

It is important for retailers to have a way to identify products and inventory for stock control and logistical purposes. Of equal importance to retailers is a theft control process using anti-theft features frequently referred to as article surveillance system. Such systems utilize technology to prevent shoplifting or any other unauthorized removal of property from the store setting. More specifically, electronic tags are attached to store merchandise that can later be removed or deactivated after the item is properly sold or released to the customer. A detection system is also placed at the store exits to detect if someone tries to remove an item with an active tag, at which time an alarm is sounded to alert store employees of the same. Unfortunately, there is no way to visually see if a tag has been properly deactivated, which leads to many false alarms and potential embarrassment to legitimate customers. Therefore, it is desirable to incorporate article surveillance or security technology with a visual indicator into existing RFID tags that are employed to track merchandise within a store setting. Further, a single multi-purpose device would reduce overall costs to the merchant. Until now, an article surveillance or security system using a visual indicator has required a separate power source, such as a battery, making the combination of such technologies cost prohibitive.

The present invention discloses a dual purpose article surveillance or security system that interfaces RFID devices, such as a merchandise tag, with the anti-tamper capability of an EAS system further comprised of a visual indicator for visually indicating whether the tag is active or has been deactivated. Historically, liquid crystal displays ("LCDs") have been used to display product information, as LCDs are affected by electric current. However, traditional LCDs require a relatively large amount of power and oftentimes require the presence of a battery or external power source.

Bi-stable, or "zero-power," displays are LCD's that can retain an image without power. The liquid crystals exist in one of two stable orientations, such as "white" and "black," without a power input. Power is only required to change the image. Cholesteric liquid crystal displays ("ChLCD") employ a helically structured liquid crystal which is chiral. ChLCD is similarly characterized by stable states that do not require power to maintain the display information over long periods of time. The states are a focal conic state (dark state) and a planar state (bright state). These displays can therefore hold an image for extended periods of time without any appreciable power drain, and only require a small voltage to switch the image from one state to the other.

Figure 2:
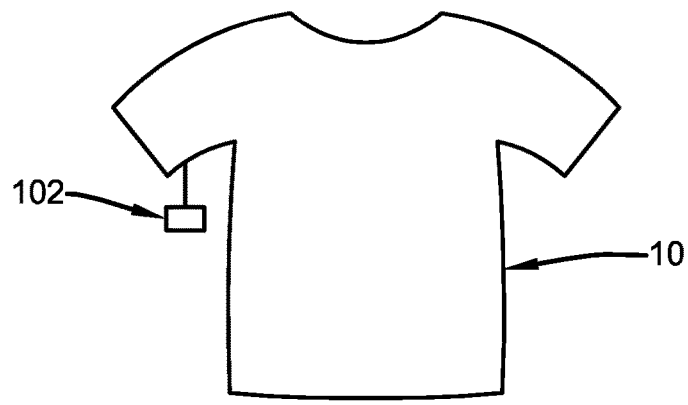
FIG. 2 illustrates the anti-tamper device attached to an article of merchandise in an activated state in accordance with the disclosed architecture.

Referring initially to the drawings, FIG. 1 illustrates an EAS system 100 for use with an article of merchandise 10. Article surveillance or security system 100 comprises an anti-tamper device 102. The anti-tamper device 102 is RFID capable and further comprises an RFID component 104 and an article surveillance or security component 114 in electrical communication with, or otherwise operably coupled to the RFID component 104. As shown in FIG. 2, the anti-tamper device 102 may be attached to an article of merchandise 10, or anything else that would benefit from article surveillance or security protection.

Figure 3:
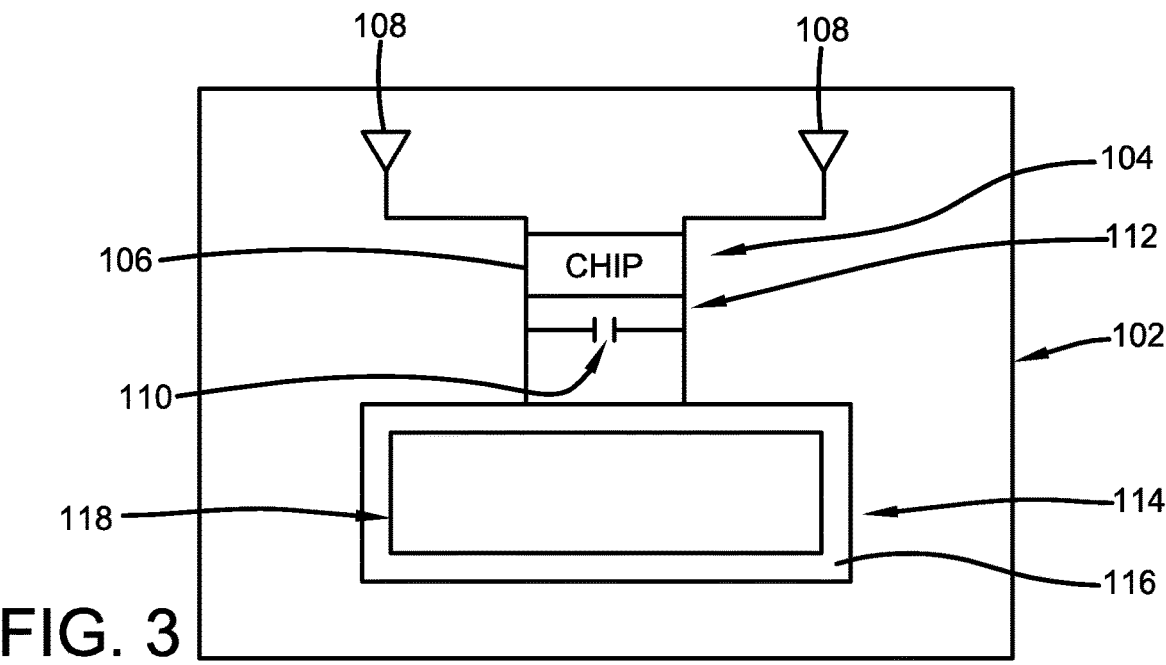
FIG. 3 schematically illustrates an embodiment of the anti-tamper device in accordance with the disclosed architecture.

As best illustrated in FIG. 3, the RFID component 104 preferably comprises a microchip 106, at least one antenna 108, and a capacitor 110. The microchip 104 may be a dual purpose or dual mode type of microchip that is capable of operating both the RFID component 104 and the article surveillance or security component 114. The at least one antenna 108 is operatively coupled to the microchip 106 and may be any type of antenna useable with a RFID tag such as, but not limited to, a dipole antenna, a slot antenna, a sloop antenna, a loop antenna, or the like, or any combination thereof. The capacitor 110 is integrated with the microchip 106 to form a circuit 112. Capacitors can store electric energy when connected to a charging circuit, and can dissipate that stored energy when disconnected from the charging circuit, thereby acting as a temporary battery. Consequently, capacitors are commonly used in electronic devices to maintain power supply when batteries are being changed or are otherwise not present. While this particular embodiment employs a capacitor 110 as the power source, the RFID component 104 may alternatively comprise any other power source known to one of ordinary skill in the art.

The article surveillance or security component 114 in FIG. 3 further comprises a display element 116. The display element 116 is electrically or otherwise operatively coupled to the RFID component 104. The display element 116 comprises a visual indicator 118 capable of indicating to a user whether or not the RFID component 104 is intact. As such, the RFID component 104 operates as an electronic seal and the article surveillance or security component 114 provides a visual indication of tampering with the seal. When the circuit 112 of the RFID component 104 is unbroken, as best illustrated in FIG. 4, the display element 116 indicates intactness of the anti-tamper device 102.

Figure 5:
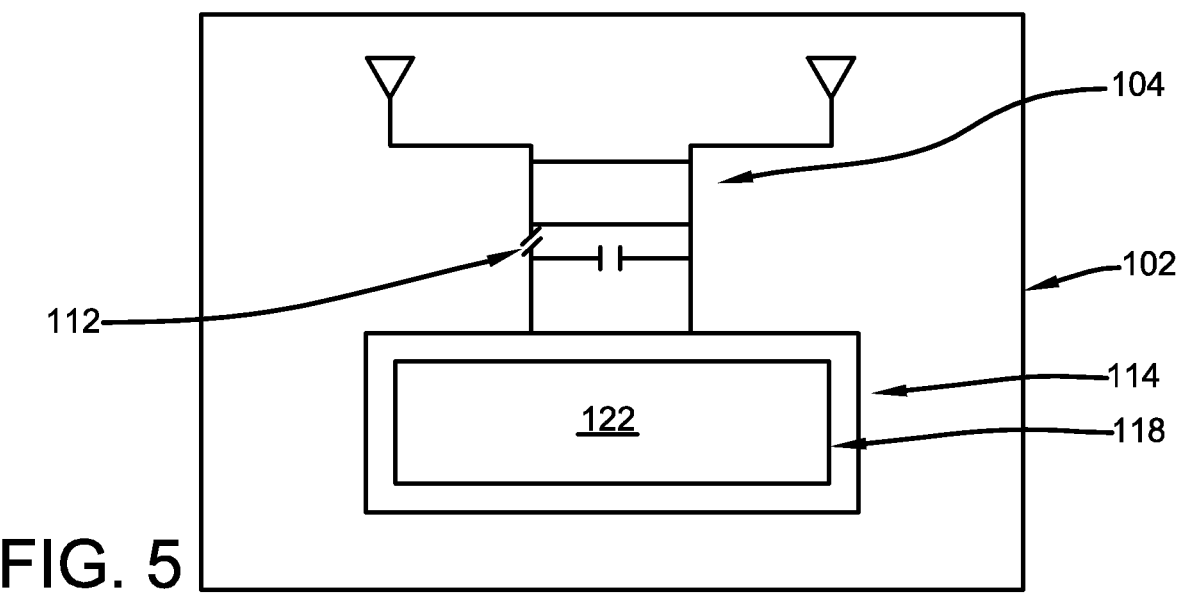
FIG. 5 schematically illustrates the anti-tamper device in a deactivated state in accordance with the disclosed architecture.

When the circuit 112 is broken or interrupted, as best illustrated in FIG. 5, the display element 116 indicates that the anti-tamper device 102 has been altered. The visual indicator 118 optically changes when the circuit 112 is interrupted. More specifically, the change in voltage from the capacitor 110 that occurs when the intact circuit is broken or short circuited provides the power to drive the change in display element 116. The visual indicator 118 then activates when the voltage in the RFID component 104 changes. As such, a battery or other external power source is not required to provide a change in the visual indicator 118 that illustrates whether the anti-tamper device 102 has been tampered with.

Figure 4:
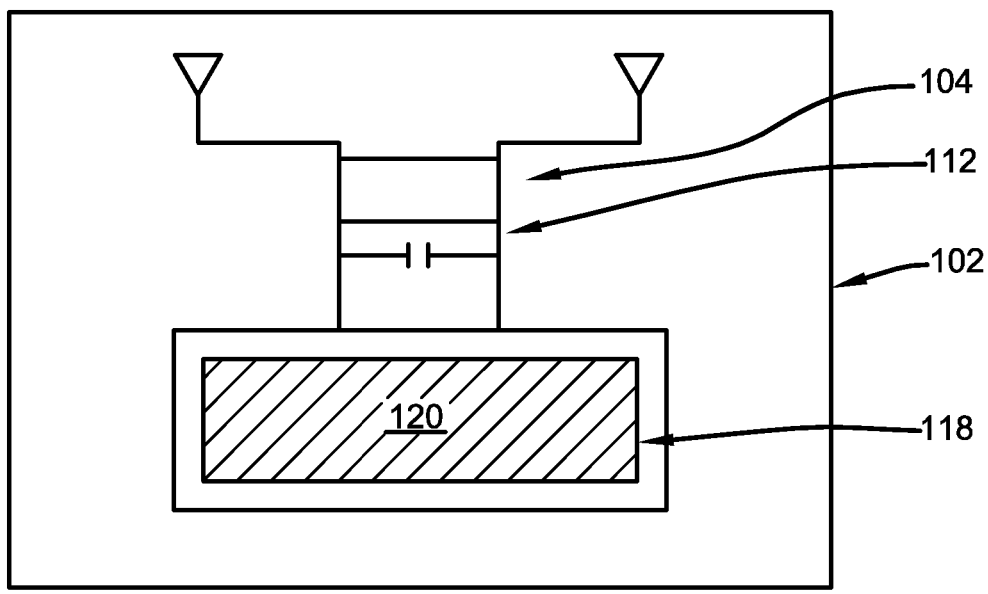
FIG. 4 schematically illustrates the anti-tamper device in an activated state in accordance with the disclosed architecture.

The display element 116 therefore does not require an external power source to indicate a first state 120 when the RFID component 104 is intact, as illustrated in FIG. 4, and a second state 120, as illustrated in FIG. 5. In one embodiment, the display element 116 is a bi-stable display. The bi-stable display may be a ChLCD display. This is advantageous as it can retain an image indicating the first state 120 without a power source. The first state 120 indicating when the RFID component 104 is intact may be a relatively dark state or color, such as black. The second state 122 indicating when the RFID component 104 is no longer intact may be a relatively bright state or color, such as white. The first state 120 may also be a focal conic state, and the second state 122 may be a planar state. Another advantage of the bi-stable display is that the change in state is generally unidirectional or permanent. As such, there will be an obvious visible indication of the status of intactness and of tampering that cannot be easily reversed.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An anti-tamper device comprising:
   an RFID component configured to be deactivated; and
   an Electronic Article Surveillance (EAS) component coupled to the RFID component and operating in a frequency range of 2-10 MHz or 50-60 kHz, with a bi-stable display for indicating whether the anti-tamper device has been deactivated, wherein the display is not powered by a battery or an external power source.

2. The anti-tamper device of claim 1, wherein the RFID component comprises a microchip, an antenna operatively coupled to the microchip, and a capacitor integrated with the microchip, and further wherein the display element is operatively coupled to the RFID component for indicating intactness of the RFID component.

3. The anti-tamper device of claim 2, wherein the antenna is selected from the group consisting of a dipole antenna, a slot antenna, a sloop antenna, and a loop antenna.

4. The anti-tamper device of claim 2, wherein the microchip and the capacitor form a circuit.

5. The anti-tamper device of claim 4, wherein the display element indicates when the circuit is intact.

6. The anti-tamper device of claim 4, wherein the display element indicates when the circuit is broken.

7. The anti-tamper device of claim 1, wherein the display element comprises a visual indicator.

8. The anti-tamper device of claim 7, wherein the visual indicator is operable without an external power source.

9. The anti-tamper device of claim 1, wherein the display element is a cholesteric liquid crystal display.

10. The anti-tamper device of claim 1, wherein the display element indicates a first state when the RFID component is intact, and a second state when the RFID component is not intact without using an external power source.

11. The anti-tamper device of claim 10, wherein the first state is a relatively dark state and the second state is a relatively bright state.

* * * * *